US012462398B2

(12) United States Patent
Fukamachi (10) Patent No.: US 12,462,398 B2
(45) Date of Patent: Nov. 4, 2025

(54) INFORMATION PROCESSING APPARATUS, CONTROL SYSTEM FOR MOBILE OBJECT, INFORMATION PROCESSING METHOD, AND STORAGE MEDIUM (71) Applicant: CANON KABUSHIKI KAISHA, Tokyo (JP)

(72) Inventor: Hitoshi Fukamachi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 17/812,293

(22) Filed: Jul. 13, 2022

(65) Prior Publication Data
US 2023/0023651 A1  Jan. 26, 2023

(30) Foreign Application Priority Data

Jul. 20, 2021  (JP) ................................ 2021-119540

(51) Int. Cl.
G06T 7/70    (2017.01)
G06T 7/246   (2017.01)

(52) U.S. Cl.
CPC .............. *G06T 7/246* (2017.01); *G06T 7/70* (2017.01)

(58) Field of Classification Search
CPC .. G06T 7/246; G06T 7/70; G06T 7/73; G06T 2207/30244; G06T 2207/30252
See application file for complete search history.

(56) References Cited

U.S. PATENT DOCUMENTS

| 9,588,518 | B2 | 3/2017 | Nakamura et al. | |
| 2017/0045895 | A1* | 2/2017 | Wang | G06T 7/246 |
| 2017/0134631 | A1* | 5/2017 | Zhao | G01S 3/7864 |
| 2019/0180077 | A1* | 6/2019 | Zhou | G06V 10/462 |
| 2020/0333789 | A1* | 10/2020 | Suzuki | G05D 1/0212 |
| 2020/0413011 | A1* | 12/2020 | Zass | G06Q 30/0185 |

(Continued)

FOREIGN PATENT DOCUMENTS

| JP | H11-134506 A | 5/1999 |
| JP | 2009-288930 A | 12/2009 |
| JP | 2011-165033 A | 8/2011 |

(Continued)

OTHER PUBLICATIONS

Halliday & Resnick, 2-1 Position, Displacement and Average Velocity, 2014, Fundamentals of Physics, pp. 13-17. (Year: 2014).*

(Continued)

Primary Examiner — Kathleen M Broughton
(74) Attorney, Agent, or Firm — VENABLE LLP (57) ABSTRACT A processor of an information processing apparatus that controls movement of a mobile object such as an automated guided vehicle or an autonomous mobile robot acquires an image in which the mobile object and the surrounding environment of the mobile object have been captured, acquires information of a position/posture of the mobile object, analyzes a motion of objects present in the surrounding environment of the mobile object based on a group of images acquired in a predetermined period of time, and determines control details with respect to movement of the mobile object based on the position information of the mobile object and the analysis result regarding the motion of the objects.

17 Claims, 8 Drawing Sheets (56) References Cited

U.S. PATENT DOCUMENTS

2022/0022715 A1* 1/2022 Park .................... B25J 19/02
2022/0207883 A1* 6/2022 Watanabe ............ G05D 1/2464

FOREIGN PATENT DOCUMENTS

| | | | | |
|---|---|---|---|---|
| JP | 2012-111011 A | | 6/2012 | |
| JP | 2019125354 A | * | 7/2019 | ............. G01S 17/89 |
| JP | 2022-38294 A | | 3/2022 | |
| KR | 20200070087 A | * | 6/2020 | ............. B25J 19/02 |
| WO | 2010/044186 A | | 4/2010 | |
| WO | 2013/171905 A1 | | 11/2013 | |
| WO | 2019/012612 A | | 1/2019 | |
| WO | WO-2019138834 A1 | * | 7/2019 | ............... G06T 7/70 |

OTHER PUBLICATIONS

Japanese Office Action issued Mar. 11, 2025 during prosecution of related Japanese application No. 2021-119540 (with machine generated English translation).

Japanese Office Action issued Jul. 17, 2025 in corresponding Japanese Patent Application No. 2021-119540 (English translation included).

* cited by examiner

INFORMATION PROCESSING APPARATUS, CONTROL SYSTEM FOR MOBILE OBJECT, INFORMATION PROCESSING METHOD, AND STORAGE MEDIUM

BACKGROUND OF THE INVENTION

Field of the Invention

The present invention relates to a technology of controlling movement of a mobile object.

Description of the Related Art

Mobile objects used in factories, logistics warehouses, and the like are devices for transporting cargo such as products and components to a predetermined place. Examples of mobile object include automated guided vehicles (AGV) and autonomous mobile robots (AMR).

JP 2009-288930A discloses a method for avoiding a collision with an obstacle more reliably when controlling movement of an autonomous mobile object. After an obstacle on a movement route is detected, a movement route for the mobile object to avoid interference with the obstacle is created, and movement thereof is controlled according to the movement route.

However, objects present on a movement route of a mobile object are not always only single obstacles. For example, a case where there are many walking people on a movement route can be assumed. In this case, in control of movement of a mobile object in the related art, there is a possibility of efficiency in setting a route to a destination and operating the mobile object decreasing.

SUMMARY OF THE INVENTION

The present invention aims to improve efficiency in an operation of a mobile object when there are a plurality of obstacles on its movement route.

An apparatus according to an embodiment of the present invention is an information processing apparatus that controls movement of a mobile object, and includes an image acquisition section that acquires a captured image in which the mobile object and a surrounding environment of the mobile object have been captured, a position information acquisition section that acquires information of a position/posture of the mobile object, an analysis section that uses a plurality of images acquired by the image acquisition section at different times to analyze a motion of a plurality of objects present in the surrounding environment of the mobile object, and a determination section that determines control details with respect to movement of the mobile object based on the information of the position/posture of the mobile object acquired by the position information acquisition section and the analysis results from the analysis section.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings. In the present embodiment, an example of a control system for an automated guided vehicle that is a mobile object will be introduced. In addition, the configurations introduced in the examples below are merely examples, and the present invention is not limited to the illustrated configurations. The same constituent elements will be given the same reference numerals to avoid overlapping description.

First Example

In the present example, an example in which the present invention is applied to a case where there are a plurality of obstacles on a movement route of a mobile object will be introduced. A method for determining control details of a mobile object heading to a destination when there are a plurality of walking people on a movement route will be described. In the present specification, a direction and a speed of a flow of an entire walking people group are defined as a movement direction and a movement speed of the people. Movement control is performed so that processing of detecting a movement direction, a speed, a density, and a position of people is performed, and a movement direction, a movement position, and a movement speed of a mobile object become similar to those of a flow of the walking people group.

Figure 1:
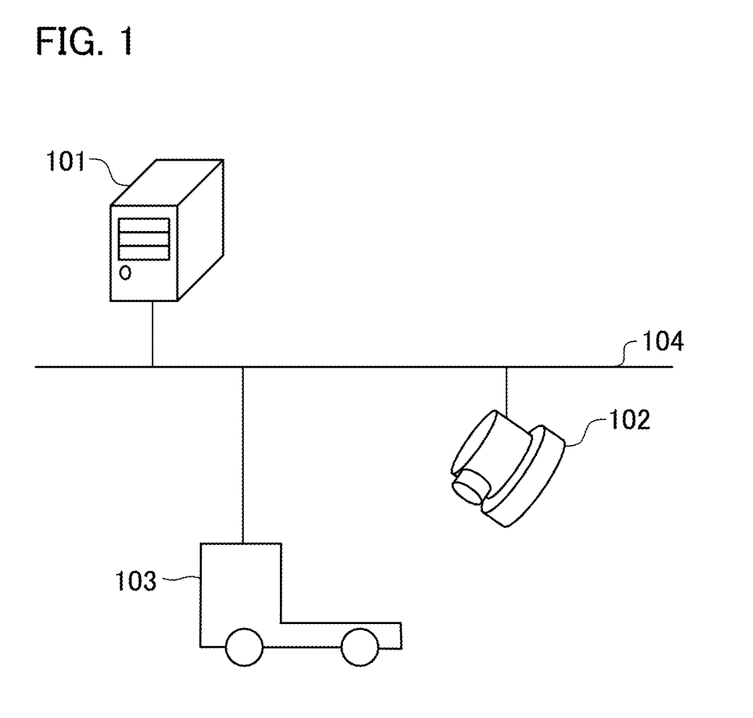
FIG. 1 is a diagram illustrating a configuration of an entire system of an information processing apparatus.

A configuration of an entire system will be described with reference to FIG. 1. FIG. 1 is a schematic diagram illustrating a configuration the entire system according to the present embodiment. The system of the present embodiment includes a computer 101, an imaging device 102, a mobile object 103, and a network 104. The computer 101 is connected to the imaging device 102 and the mobile object 103 via the network 104. The network 104 can be realized by wired connection such as Ethernet (a registered trademark) or wireless connection such as a wireless local area network (LAN). There is no particular limitation on the network 104 as long as it has a configuration in which apparatuses connected thereto can communicate information with each other.

The imaging device 102 is a network camera, or the like. For example, in a case where an imaging area of the imaging device 102 is within the site of a factory, the imaging device 102 is installed to capture an image of the entire site in a bird's eye view. The imaging device 102 captures an image of the entire site in a bird's eye view based on information received from the computer 101, and transmits the signal of the acquired captured image to the computer 101.

The mobile object 103 is an automated guided vehicle, and performs computation of a position/posture, a setting of a destination, movement to the destination, and the like based on information received from the computer 101. Further, the mobile object 103 will be referred to as an AGV 103 in the description below.

The computer 101 receives the captured image signal from the imaging device 102 and performs analysis processing of a motion of an object included in the captured image. In addition, the computer 101 acquires information of the position/posture of the AGV 103. The information of the position/posture is information representing a position and a direction of the object in the real space. Although the information of a position/posture will be referred to as "position information" in the description below, it includes posture information as well. The computer 101 performs processing of setting a movement route and processing of determining control details for the AGV 103 based on the acquired position information of the AGV 103 and an image analysis result of the captured image. Details of software functions of the computer 101 will be described later.

Figure 2:
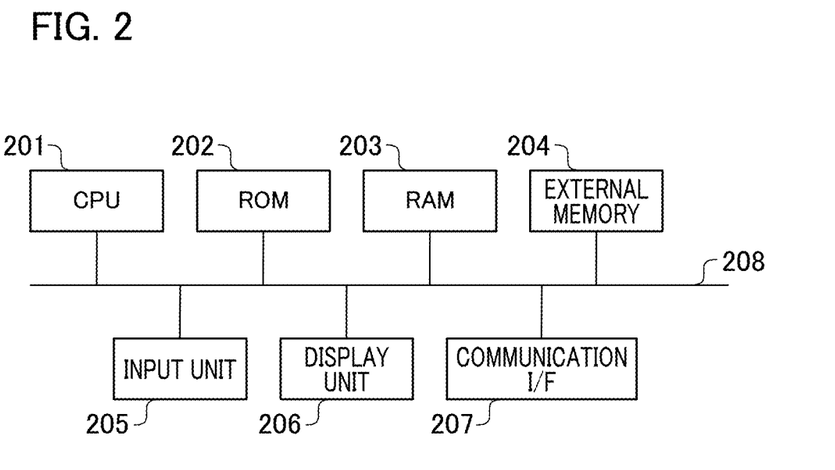
FIG. 2 is a block diagram illustrating a configuration of the information processing apparatus.

A hardware configuration of the computer 101 will be described with reference to FIG. 2. FIG. 2 is a block diagram illustrating a configuration of the computer 101. A central processing unit (CPU) 201 controls various devices connected to a system bus 208. A read only memory (ROM) 202 stores a program of a basic input/output system (BIOS) or a boot program. A random access memory (RAM) 203 is used as a main storage device of the CPU 201. An external memory 204 stores programs to be processed by the computer 101.

An input unit 205 is a keyboard, a pointing device, a robot controller, or the like and performs input processing of information from a user, or the like. A display unit 206 has a display device such as a liquid crystal display or a projector, and outputs an arithmetic result of the computer 101 to the display device according to a command from the CPU 201 to display the result on a screen. A communication interface (I/F) unit 207 enables communication of information with the imaging device 102 or the AGV 103.

Figure 3:
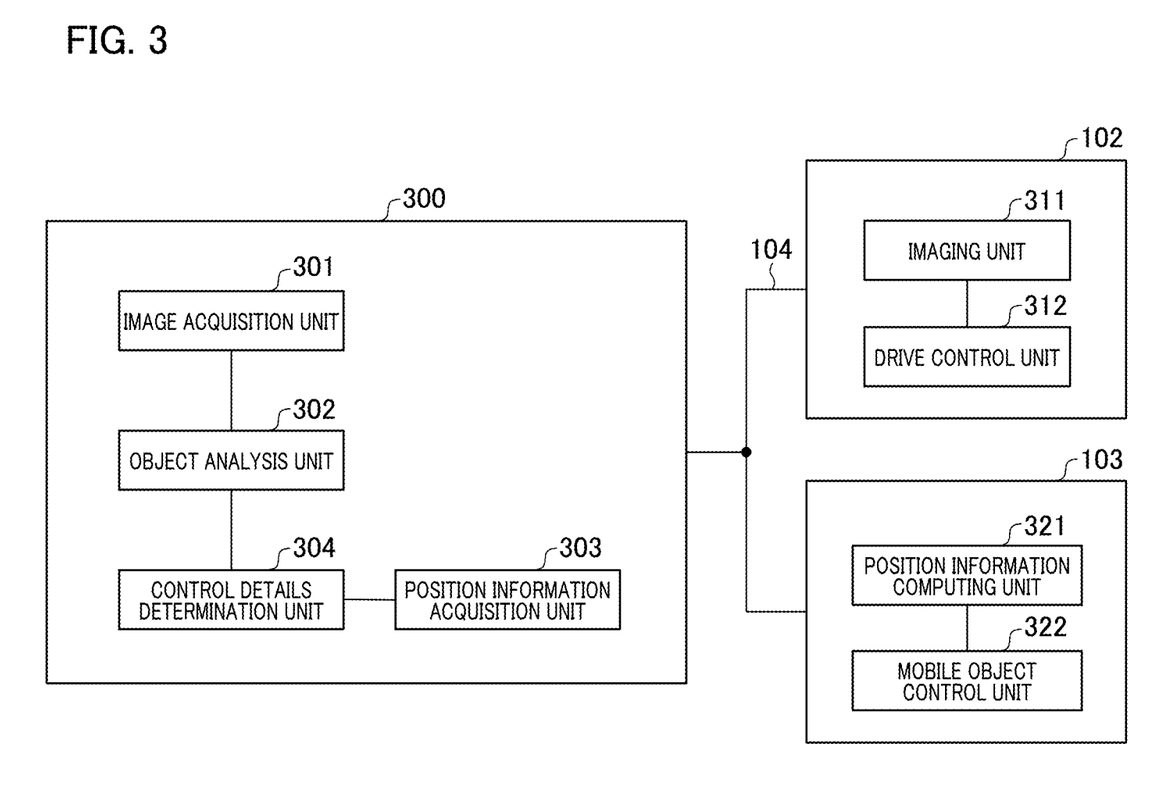
FIG. 3 is a block diagram illustrating a functional configuration of the information processing apparatus.

A functional configuration of an information processing apparatus according to the present example will be described with reference to FIG. 3. FIG. 3 is a block diagram illustrating a functional configuration of an information processing apparatus 300, the imaging device 102, and the AGV 103. The information processing apparatus 300 corresponds to a software functional configuration of the computer 101, and includes an image acquisition unit 301, an object analysis unit 302, a position information acquisition unit 303, and a control details determination unit 304. The image acquisition unit 301 receives a signal of an image captured by the imaging device 102 for a predetermined period of time to acquire image data. The image data and various kinds of information are transmitted and/or received via the network 104.

The object analysis unit 302 analyzes an object included in a captured image acquired by the image acquisition unit 301. In the object analysis, statistical quantities such as a movement direction and a movement speed of the object, a density of objects (a distribution density or a degree of concentration), and a position of the objects are computed. The object analysis unit 302 outputs the computed statistical quantities to the control details determination unit 304.

The position information acquisition unit 303 acquires information of a position/posture of the AGV 103 computed by a position information computing unit 321, which will be described below, as position information. The control details determination unit 304 determines control details for the AGV 103 based on the position information of the AGV 103 acquired by the position information acquisition unit 303 and the statistical quantities that are analysis results from the object analysis unit 302. Details of the processing performed by the control details determination unit 304 will be described later.

The imaging device 102 includes an imaging unit 311 and a drive control unit 312. The imaging unit 311 images a subject to record image data thereof. The drive control unit 312 performs drive control of an imaging direction and an imaging angle of view. Specifically, PTZ control of the imaging unit 311 is performed. The P, T, and Z are the first letters of panning, tilting, and zooming, respectively.

The AGV 103 includes the position information computing unit 321 and a mobile object control unit 322. The position information computing unit 321 receives a signal of a captured image acquired by the imaging unit 311 to detect the AGV 103 in the captured image. The position information computing unit 321 computes the detected coordinate values as position information. The mobile object control unit 322 performs control of a motor that is an actuator included in the AGV 103, steering control to change a direction of a wheel thereof, and the like.

Figure 4:
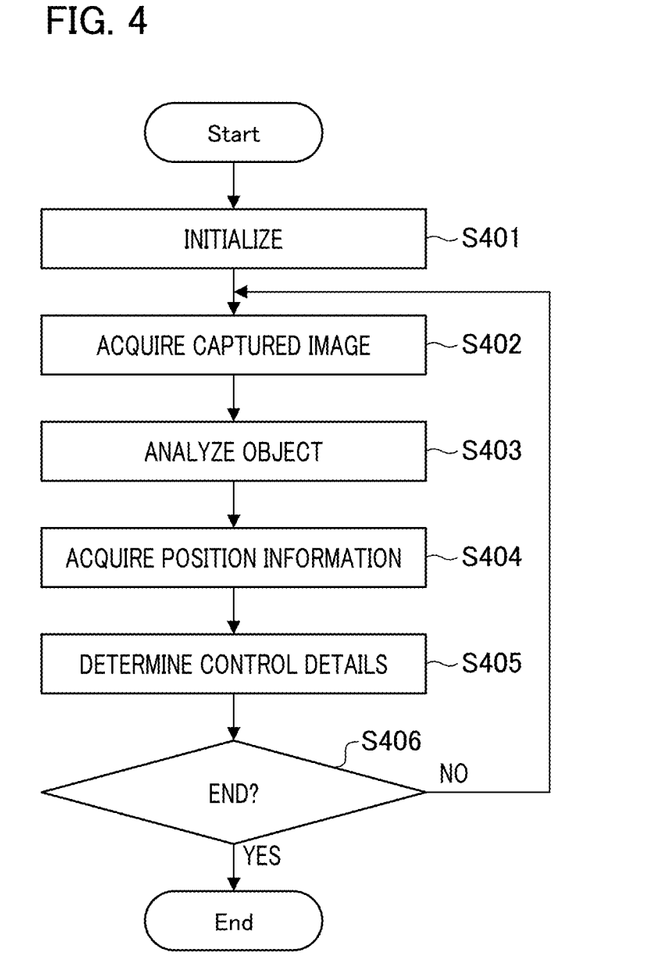
FIG. 4 is a flowchart showing processing of an information processing apparatus according to a first example.

Control of adjusting a movement speed and a movement position of the AGV 103 in accordance with a flow of a plurality of moving objects (other AGVs, AMRs, etc.) or people in the present example will be described with reference to FIG. 4. FIG. 4 is a flowchart for explaining processing of the information processing apparatus 300, and each processing operation is realized by the CPU 201 executing a control program. A state in which there are a plurality of walking people on a movement route of the AGV 103 is assumed, and a method for determining details of movement control for the AGV 103 heading to a destination will be described.

In S401, system initialization processing is performed. Processing of reading a program from the external memory 204 is performed to set the information processing apparatus 300 in an operable state. In addition, the information processing apparatus 300 sets a destination of the AGV 103 in S401. A destination is a predetermined place to which a user wants to move the AGV 103, and when coordinates in a real space are denoted by $(X_{WT}, Y_{WT})$, a destination is set by designating coordinate values thereto. In addition, processing of reading a coordinate conversion table showing a correspondence relationship between coordinate values in a captured image and coordinate values in a real space is performed. Coordinates of a captured image are denoted by $(X_T, Y_T)$. The coordinate conversion table can be used to convert coordinate values in a captured image into a corresponding position in a real space. Specifically, data of the coordinate conversion table includes a rotation matrix for converting coordinate values in the captured image into the corresponding position in the real space, a parallel movement vector, a focal length of a camera that is an internal parameter of the camera, and a value of camera resolution. This coordinate conversion table enables coordinates $(X_{WT}, Y_{WT})$ in the real space to be obtained from the coordinates $(X_T, Y_T)$ in the captured image. Further, although the coordinates can be extended to coordinates $(X_T, Y_T, Z_T)$ and coordinates $(X_{WT}, Y_{WT}, Z_{WT})$ in a three-dimensional coordinate system, movement control in a two-dimensional coordinate system will be described below.

In S402, the image acquisition unit 301 performs processing of acquiring data of the image captured by the imaging device 102. The captured image is, for example, a bird's-eye view image obtained by capturing an entire site. It is assumed that a plurality of pieces of image data are acquired from T seconds ago until now as image information of a predetermined period. However, an arbitrary value may be set for the T seconds that is a predetermined period of time.

In S403, the object analysis unit 302 performs object analysis processing. For example, processing of computing statistical quantities such as a movement direction and a movement speed of people, a distribution density of people, and positions of people is performed based on a data group of captured images acquired in S402. Details of the processing will be described below using FIG. 5.

In S404, the position information acquisition unit 303 performs processing of acquiring position information of the AGV 103. The information acquired here is information of coordinates and directions in the real space. Coordinates of the AGV 103 in the real space are denoted by $(X_{WC}, Y_{WC})$.

In S405, the control details determination unit 304 performs processing of determining control details with respect to movement of the AGV 103 based on the statistical quantities computed in S403 and the position information acquired in S404. As the control details, a movement direction, a movement speed, a movement position, and the like of the AGV 103 are determined. Details of the processing will be described below using FIG. 6.

In S406, the information processing apparatus 300 determines whether the AGV 103 has arrived at the destination as termination determination processing. If it is determined that the AGV 103 has arrived at the destination, the processing shown in FIG. 4 is terminated, and if it is determined that the AGV 103 has not arrived at the destination, the processing transitions to S402 to be continued.

Figure 5:
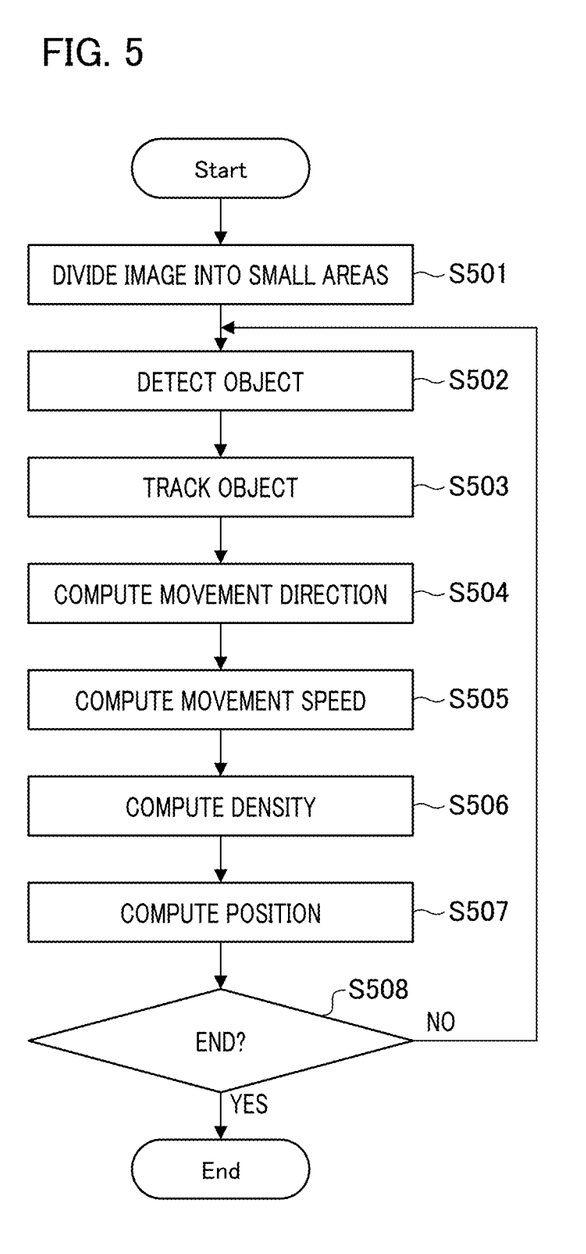
FIG. 5 is a flowchart showing processing of object analysis according to the first example.

Next, the processing performed by the object analysis unit 302 in S403 of FIG. 4 will be described in detail with reference to FIG. 5. FIG. 5 is a flowchart for explaining object analysis and evaluation value computing processing. First, in S501, processing of dividing the captured image into a plurality of small areas is performed. For example, processing of segmenting the captured image into five in the vertical direction and five in the horizontal direction is performed to divide the image into 25 rectangular small areas. Each of the divisional small areas is continuously processed from S502 to S508.

Next, the object analysis unit 302 detects the heads of people in the captured image in S502. A model for detecting the heads of people is prepared in advance, and the detection of people is performed by applying a template matching method. The object analysis unit 302 estimates the coordinate positions of the feet of the people on the captured image using the detected heads of the people. Furthermore, the object analysis unit 302 obtains coordinates of the feet of the people in the real space for the coordinates thereof estimated on the captured image using the coordinate conversion table.

In S503, the object analysis unit 302 tracks motions of the people detected in S502. Specifically, processing of computing movement amounts of the people detected in S502 who are targets from a group of consecutive captured images (captured image frames) is performed. Coordinates of each target person at an arbitrary time (t) are denoted by $(X_{W1(t)}, Y_{W1(t)})$, and coordinates of the target person from the time (t) to a past time by one unit time (t−1) are denoted by $(X_{W1(t-1)}, Y_{W1(t-1)})$.

A movement amount ($\Delta X1$, $\Delta Y1$) is computed from the difference between the coordinates $(X_{W1(t)}, Y_{W1(t)})$ and the coordinates $(X_{W1(t-1)}, Y_{W1(t-1)})$ as expressed by the following formula 1.

$$\Delta X_1 = X_{W1(t)} \times X_{W1(t-1)}$$

$$\Delta Y_1 = Y_{W1(t)} - Y_{W1(t-1)} \quad \text{Formula 1}$$

Here, the computed movement amount is referred to as a movement vector. The object analysis unit 302 computes a movement vector of each person for the number of people included in the small area detected in S502. Further, for the computation of movement vectors, the coordinates in the real space computed in S502 are used.

In S504, the object analysis unit 302 computes a value corresponding to the movement direction of the people. The value of the movement direction of the people is a value indicating in which direction the people flow as a whole. The object analysis unit 302 adds the movement vectors computed in S503 up for the number of tracked people. By obtaining the direction of the added-up movement vector, the value corresponding to the movement direction of the people is acquired.

In S505, the object analysis unit 302 computes a movement speed of the people. The add-up movement vector obtained in S504 is divided by the number of tracked people and the differential time (the difference between the time (t) and the time (t−1)). As a result, the average movement speed can be computed.

In S506, the object analysis unit 302 computes a density of the people. A density of the people (distribution density) can be computed by dividing the number of people included in each small area divided off in S501 by the area of the real space corresponding to one small area.

In S507, the object analysis unit 302 computes positions of the people. The position of each person is a value indicating which area in the small area the detected person is. The object analysis unit 302 performs processing of averaging the coordinates of the people detected in S502 and computing the coordinates of the arithmetic results in the real space.

In S508, the object analysis unit 302 determines whether the computation of statistical quantities for all of the small areas has been terminated. If it is determined that the processing from S502 to S507 for all of the small areas has been completed, the processing ends. If it is determined that the processing has not been completed, the processing returns to the object detection of S502 so that the processing is continuously performed on the next small area.

Figure 6:
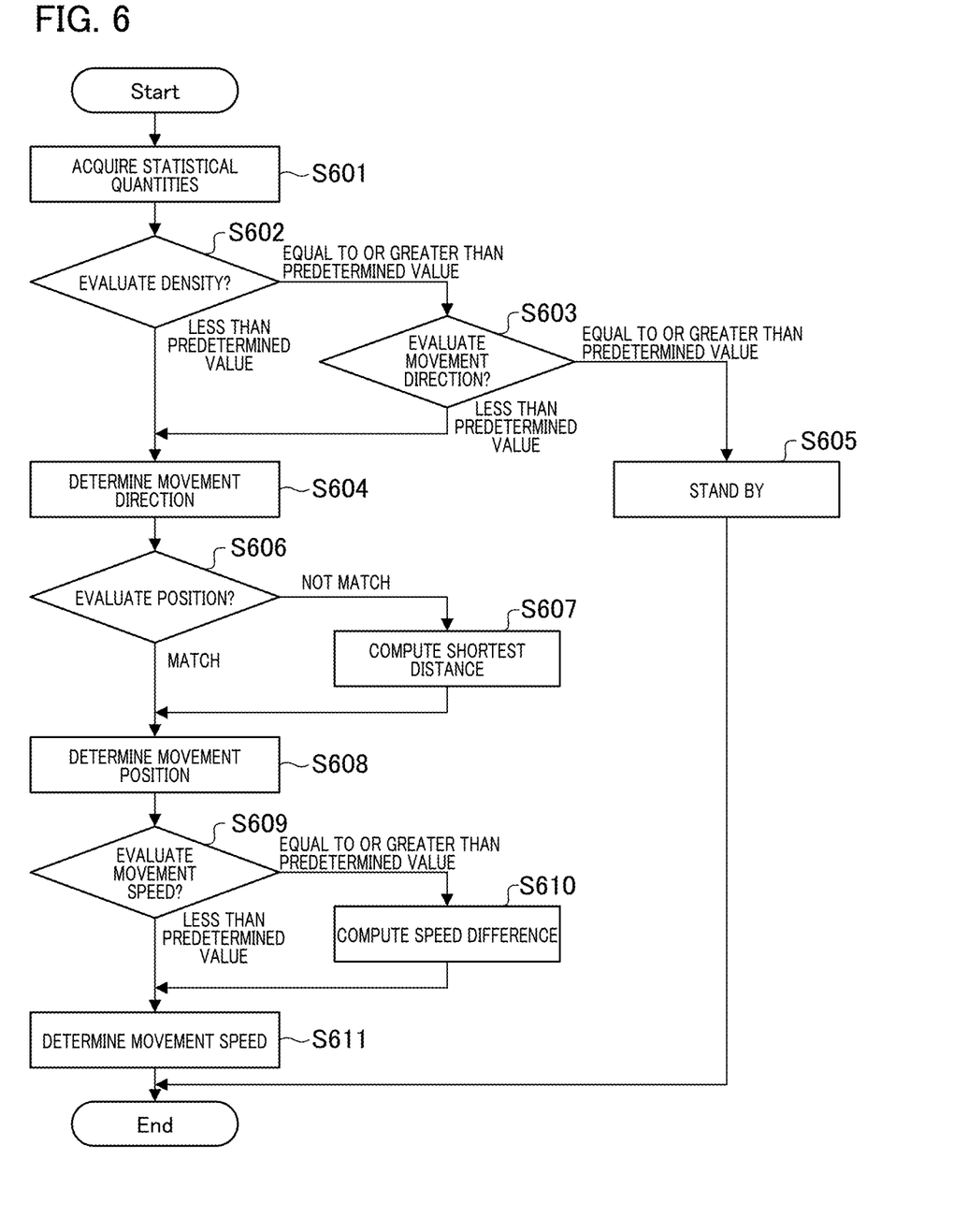
FIG. 6 is a flowchart showing control details determination processing according to the first example.

Processing of determining control details for the AGV 103, that is, a movement direction, a movement speed, and a movement position, based on the statistical quantities obtained in the above processing and predetermined conditions is performed. FIG. 6 is a flowchart for explaining processing performed by the control details determination unit 304 in S405 of FIG. 4.

First, in S601, the control details determination unit 304 acquires the statistical quantities computed in S403. Next, the control details determination unit 304 evaluates the density value in S602. The density value is compared with a predetermined value (threshold). If it is determined that the density value is less than the predetermined value, the processing proceeds to S604. On the other hand, if it is determined that the evaluated density value is equal to or greater than the predetermined value, the processing proceeds to S603.

The control details determination unit 304 evaluates the value of the movement direction in S603. Processing of comparing the value indicating the movement direction of the people with the value indicating the direction of the AGV 103 acquired in S404 is performed. Specifically, the angular difference between the direction of the movement vector corresponding to the value of the movement direction of the people and the direction of the AGV 103 is computed. If the computed angular difference is compared with a predetermined value (threshold) and it is determined that the angular difference is less than the predetermined value, the processing proceeds to S604, and if it is determined that the computed angular difference is equal to or greater than the predetermined value, the processing proceeds to S605. Further, the computed angular difference being less than the threshold indicates that the movement direction of the AGV 103 is close to the movement direction of the people. Further, the computed angular difference being equal to or greater than the threshold indicates that the movement direction of the AGV 103 is significantly different from the movement direction of the people.

In S604, the control details determination unit 304 determines the movement direction of the AGV 103 based on the determination results of S602 and S603. Here, it is determined that the movement direction of the AGV 103 will not be changed, and the processing proceeds to the processing of S606. In S605, the control details determination unit 304 determines to perform stand-by control for a predetermined period of time as control detail for the AGV 103 based on the determination results of S602 and S603. The AGV 103 stands by for the predetermined period of time, and each of the processing operations is performed in order from S601 to determine the next control details again.

In S606, the control details determination unit 304 evaluates the positions. The values of the positions of the people are compared with the position information of the AGV 103. The position of each person is a value indicating which area in the small area the person is, as described in S507. The control details determination unit 304 performs processing of computing in which area within the small area the position is included from the position information of the AGV 103, as in S507. Specifically, a value corresponding to the area identified with two-dimensional (the lateral direction and the longitudinal direction) position indicators within the small area is computed. If it is determined that the computed area in which the AGV 103 is positioned matches the area indicating the position of the people, the processing proceeds to S608, and if it is determined that the areas do not match, the processing proceeds to S607.

In S607, the control details determination unit 304 computes the shortest distance to the central position in the two-dimensional area within the small area indicating the position of the people from the position information of the AGV 103. Coordinates of the central position are subject to coordinate conversion from coordinates on the captured image into coordinates in the real space to compute the shortest distance in the real space. The processing proceeds to S608 after S607.

In S608, the control details determination unit 304 determines control details for the movement direction of the AGV 103 based on the determination results of S606 and S607. If it is determined that the area in which the AGV 103 is positioned matches the area indicating the position of the people, the control details determination unit 304 determines not to change the movement position. In addition, if it is determined that the area in which the AGV 103 is positioned does not match the area indicating the position of the people, the control details determination unit 304 determines to adjust the movement position in the direction of the area indicating the position of the people with reference to the shortest distance computed in S607.

In S609, the control details determination unit 304 evaluates the movement speed. The movement speed of the people is compared with the that of the AGV 103. The control details determination unit 304 computes the absolute value of the difference between the movement speed of the people and that of the AGV 103 and compares the absolute value with a predetermined value (threshold). If it is determined that the computed value is less than the predetermined value, the processing proceeds to S611, and if it is determined that the computed value is equal to or greater than the predetermined value, the processing proceeds to S610.

In S610, the control details determination unit 304 computes the speed difference between the movement speed of the people and that of the AGV 103. In other words, the speed difference is computed by subtracting the movement speed of the AGV 103 from that of the people. Then, the processing proceeds to S611. In S611, the control details determination unit 304 determines control details for the movement speed of the AGV 103 based on the determination results of S609 and S610. If the value computed in S609 is less than the threshold, the control details determination unit 304 does not change the movement speed of the AGV 103 to maintain the current movement speed. On the other hand, if the value computed in S609 is equal to or greater than the threshold, the control details determination unit 304 adds the speed difference computed in S610 to the current movement speed as a correction amount. In other words, the movement speed is adjusted so that the AGV approaches the flow of the people (the flow of the walking people group).

The movement direction, the movement speed, and the movement position of the AGV 103 are controlled according to the flow of the people as described above, and the AGV 103 advances toward the destination accordingly. Signals corresponding to the control details determined by the control details determination unit 304 are transmitted to the mobile object control unit 322, and the AGV 103 is controlled such that it moves to the destination based on the control details.

In S406 (termination determination) of FIG. 4, it is determined whether the AGV 103 has arrived at the destination by comparing the coordinates ($X_{WT}$, $Y_{WT}$) of the destination indicated in S401 and the position information ($X_{WC}$, $Y_{WC}$) of the AGV 103 acquired in S404. Specifically, if the difference between the X and Y coordinates is computed as expressed in formula 2 below and the absolute value of the difference is less than or equal to a predetermined threshold, it is determined that the AGV 103 has arrived at the destination. If the difference between the X and Y coordinates is greater than the predetermined threshold, it is determined that the AGV 103 has not arrived at the destination, the processing returns to S402 to be continued.

$$|X_{WT}-X_{WC}| \leq PX_{th}$$

$$|Y_{WT}-Y_{WC}| \leq PY_{th} \qquad \text{Formula 2}$$

$X_{WT}$: X coordinate value of the destination
$Y_{WT}$: Y coordinate value of the destination
$X_{WC}$: Current X coordinate value of the AGV 103
$Y_{WC}$: Current Y coordinate value of the AGV 103
$PX_{th}$: Predetermined threshold of X coordinate
$PY_{th}$: Predetermined threshold of Y coordinate According to the present example, control details for movement of the mobile object can be accurately determined using the statistical quantities computed in S403 of FIG. 4, and thus movement of the mobile object can be controlled in consideration of the flow of the people. The mobile object advances toward the destination in accordance with the flow of the people without being stalled even in a congested situation, and thus the operation efficiency of the mobile object can be improved.

Modified Example of First Example

Next, a modified example of the first example will be described.

Modified Example 1-1

Although the example in which the position information of the AGV 103 is computed from a captured image has been introduced in the first example, another example of a method for computing position information of the AGV 103 will be described in the present modified example. A sensor for measuring position information (GPS, RFID, a beacon, etc.) is mounted in the AGV 103 to compute position information of the AGV 103 based on a sensor output. GPS is an abbreviation for "Global Positioning System, and RFID is an abbreviation for "Radio Frequency Identifier."

In addition, a camera and a sensor are mounted in the AGV 103 in order to compute position information of the AGV 103 using an image captured by the mounted camera, or sensor (light detection and ranging or LiDAR) information by applying a SLAM technique. SLAM is an abbreviation for "Simultaneous Localization And Mapping." In addition, although the position information computing unit 321 that computes position information of the AGV 103 is introduced as a function of the AGV 103 in the first example, the example is not limited to this configuration. In the modified example, the function is included as one of functions of the information processing apparatus 300. Alternatively, a configuration in which the imaging device 102 or another device includes the position information computing unit 321 may be adopted.

Modified Example 1-2

The example in which object analysis is performed on a current image captured by the imaging device 102 has been introduced in the first example. Object analysis can be applied to a past captured image. In the present modified example, signals of a plurality of images captured by the imaging device 102 for a predetermined period of time are received to acquire past captured images. Processing of acquiring a plurality of image data group for the predetermined period of time such as a few seconds, a few minutes, a few hours, and a few days is performed. In addition, object analysis is performed on the past captured images and processing of computing statistical quantities (a movement direction, a movement speed, a density, and a position of people) is performed.

Furthermore, in the present modified example, processing of aggregating computed statistical quantities for each time slot to ascertain a congested time slot and the flow of people in each time slot is performed. Specifically, there is a place at the entrance of a building or the like that becomes congested depending on a time slot. A route of the AGV 103 may be set such that the AGV avoids such a place as an advance-not-possible area in the contested time slot. When a route search algorithm such as the known Dijkstra's algorithm is used, a route can be set to avoid a congested place by giving a cost to an advance-not-possible area and obtaining an appropriate route. On the other hand, a cost may be reduced for an advance-possible area in a non-congested time slot to be set as a travel route of the AGV 103. In the present modified example described above, the data of the statistical quantities for each time slot is retained to set an advance-possible area and an advance-not-possible area according to the statistical quantities, and thus the operation efficiency of the mobile object can be enhanced.

Modified Example 1-3

In the present modified example, control details of the AGV 103 are determined according to statistical quantities of a flow of people, instead of being based on magnitude determination of statistical quantities computed in object analysis and a predetermined threshold. In other words, control details of the AGV 103 are determined using an analog value corresponding to a degree that is disadvantageous for advance of the AGV 103, instead of performing binary determination by comparing an evaluation value of a flow of people with a threshold.

As an example, control details for a movement speed of the AGV 103 are determined according to a density of people. As a density of people becomes lower, the AGV 103 is controlled such that it has a higher movement speed, and as a density of people becomes higher, the AGV 103 is controlled such that it has a lower movement speed. In addition, control details for a movement position of the AGV 103 are determined according to a density of people. Specifically, as a density of people becomes higher, the AGV 103 is controlled such that it has a smaller amount of change in a movement position. As described above, the operation efficiency can be improved by determining control details for the AGV 103 continuously or stepwise according to a density of people in the present modified example.

Modified Example 1-4

A target for object analysis in the present modified example is not limited to people and may be an arbitrary moving object. For example, another AGV, a forklift, a flying object, a bicycle, a car, or the like in the vicinity (nearby environment) of the AGV 103 can be a target of object analysis. Specifically, in object analysis for a forklift, a model of template matching used in an object detection method is changed. By performing object detection using a model of a forklift, forklift object analysis can be performed, an object as a detection target can be changed, and thus each target can be evaluated. In a case where a plurality of types of detection targets are mixed, objects can be analyzed using the above-described method by using a plurality of models. According to the present modified example, the operation efficiency of a mobile object can be improved in consideration of people as well as an arbitrary object.

Modified Example 1-5

In the first example, the method in which a captured image is divided into a plurality of small areas and control details for the AGV 103 are determined based on statistical quantities computed for each of the small areas has been introduced. In the present modified example, small areas are further finely divided, and control details for the AGV 103 are determined based on statistical quantities computed for more fine areas. Specifically, processing of computing statistical quantities with respect to a flow of people in an advance direction of the AGV 103 is performed to enable the AGV to track the flow of people present in the advance direction. The control details for the AGV 103 are determined based on the computed statistical quantities. In addition, in a case where the AGV 103 guides a person, processing of computing statistical quantities with respect to the flow of the people on the side opposite to the advancing side, that is, the rear side, is performed, and control details for the AGV 103 are determined based on the computed statistical quantities. According to the present modified example, movement control such as tracking or guiding of a moving body is possible, and the operation efficiency of the mobile object can be improved.

Second Example

Next, a second example of the present invention will be described. In the present example, an example in which a detour route is set when it is difficult for the AGV 103 to move due to a flow of people will be introduced. Further, description of matters similar to those of the first example will be omitted, and differences will be mainly described. This omission method for description is likewise applied to examples or modified examples to be described below.

In the first example, the example in which, in a case where a movement direction of people is similar to that of the AGV 103 on a set movement route, the movement speed of the AGV is adjusted to be close to that of the flow of people has been introduced. In the present example, a method for determining control details including change of a route of the AGV 103 in a case where a movement direction of people is significantly different from that of the AGV 103 will be described.

In the present example, a movement direction, a movement speed, a density, and a position of a flow of people are detected, and the movement direction of the people and a movement direction of the AGV 103 are compared. In a case where the movement direction of the people and that of the AGV 103 are more significantly different, processing of changing the movement direction of the AGV 103 is performed. Processing of changing the movement route is performed according to the change of the movement direction of the AGV 103. Then, the movement direction, the movement position, and the movement speed of the AGV 103 are controlled again based on statistical quantities of the flow of the people.

Figure 7:
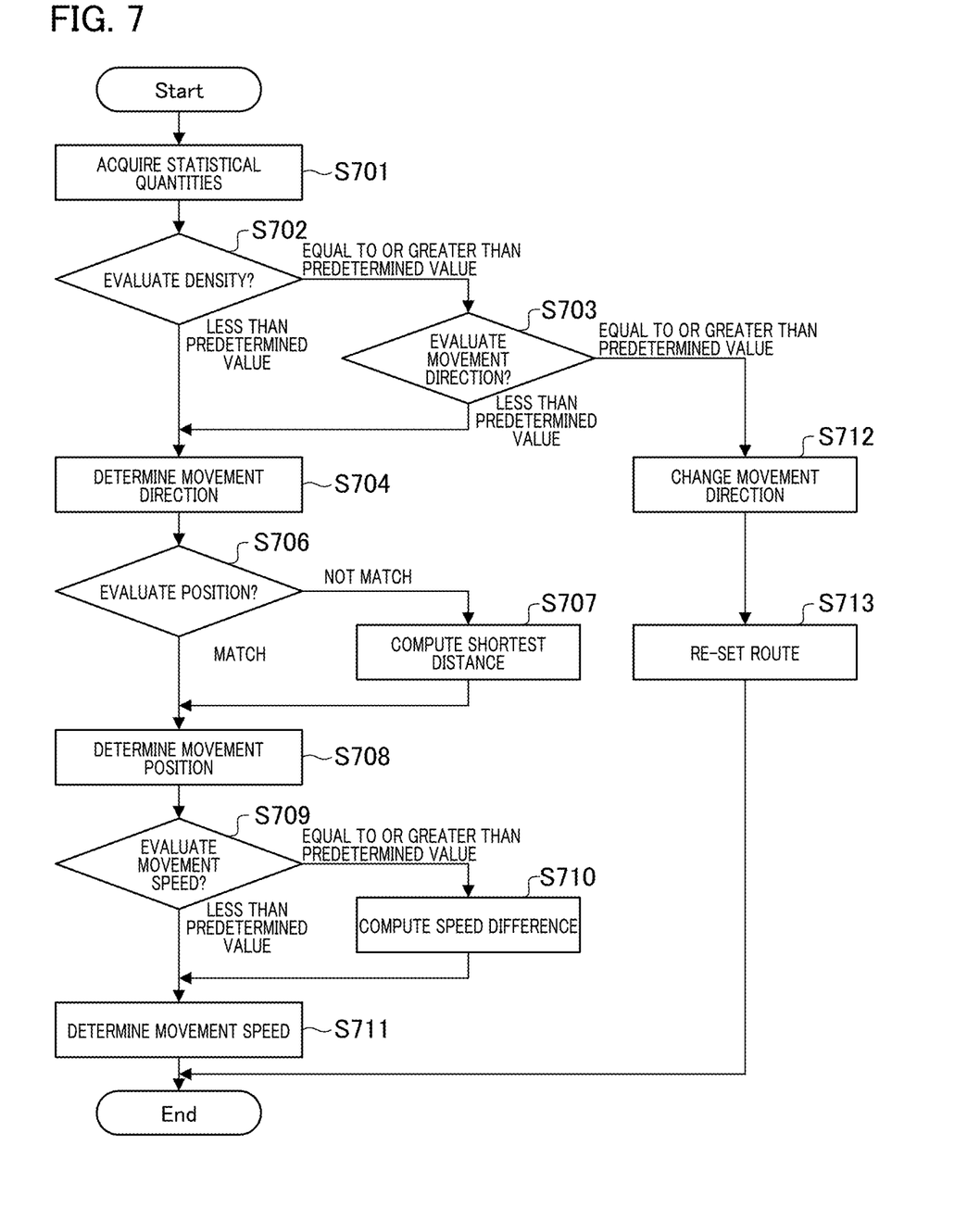
FIG. 7 is a flowchart showing control details determination processing according to a second example.

FIG. 7 is a flowchart for explaining processing of determining control details for the AGV 103 according to the present example. The overall processing is similar to that of the first example. Because the processing from S701 to S704 and S706 to S711 is the same as that from S601 to S604 and S606 to S611 of FIG. 6, description thereof will be omitted.

The control details determination unit 304 proceeds from S703 to S712 to change the movement direction of the AGV 103 based on the determination results of S702 and S703. The control details determination unit reaches this step in a case where the density result of S702 has a value equal to or greater than a predetermined value and the angular difference in movement direction between the AGV 103 and the people is equal to or greater than a threshold in S703. The control details determination unit 304 changes the movement direction of the AGV 103 so that it becomes close to the statistical quantity of the movement direction of the people acquired in S701.

In S713, the control details determination unit 304 re-sets a movement route to the destination. The movement route to the destination in the movement direction of the AGV 103 changed in S712 is re-set. By changing the movement direction of the AGV 103 and re-setting the movement route to the destination as described above, the AGV 103 can advance in accordance with the flow of the people without being stalled.

In the present example, movement can be controlled in consideration of the flow of the people even through the direction of the flow of the people is different from the movement direction of the AGV 103. By determining control details for the AGV 103 in accordance with statistical quantities such as a density, a movement speed, and a position, the AGV 103 can advance toward the destination, and thus operation efficiency thereof can be improved.

Third Example

A third example of the present invention will be described with reference to FIG. 8. In the first and second examples, the example in which a movement direction, a movement speed, and a movement position of the AGV 103 are determined as control details therefor based on each of statistical quantities computed in object analysis has been introduced. In the present example, an example in which each of statistical quantities computed in object analysis is visualized for display and utilized to set a movement route of the AGV 103 will be introduced. A functional configuration of an information processing apparatus 300 of the present example is obtained by adding a display section (a display unit 206 and a display control program) to the functional configuration of FIG. 3 described in the first example.

Figure 8:
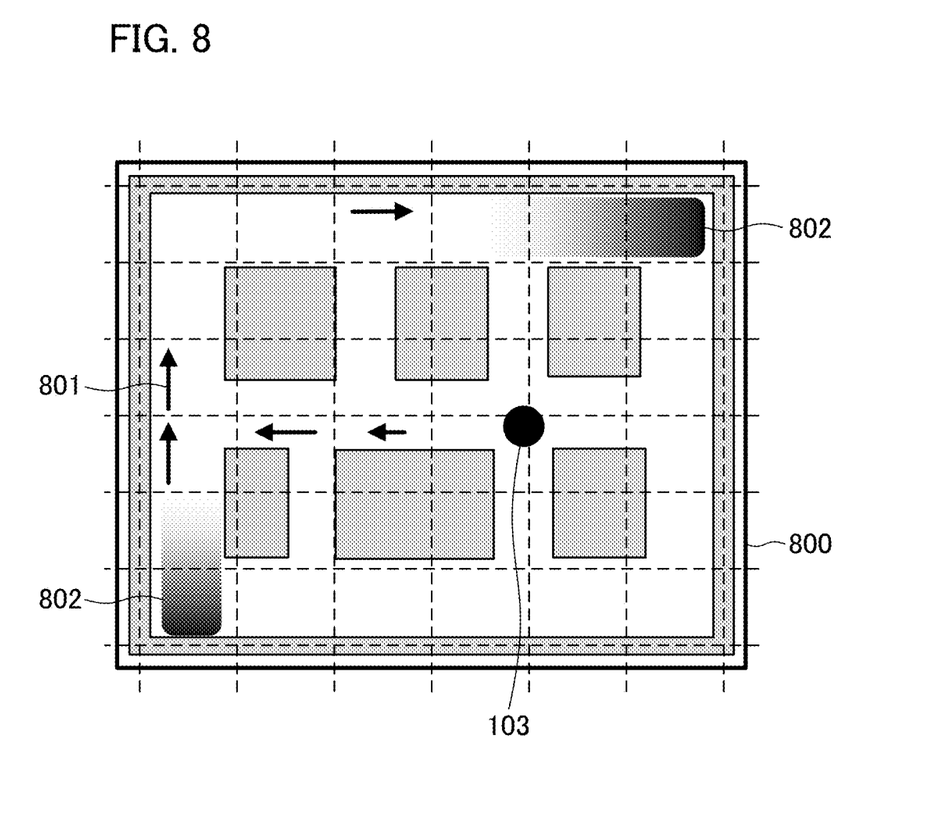
FIG. 8 is a schematic diagram illustrating an example of display information according to a third example.

FIG. 8 is a schematic diagram illustrating an example of a UI (user interface) screen output on the display unit 206 in the present example. An image 800 captured by an imaging device 102 is displayed on a display screen. As information of statistical quantities computed by an object analysis unit 302, the sizes (magnitude) of a density, a movement direction, and a movement speed of people are superimposed and displayed on the captured image 800. A position of the AGV 103 in the captured image 800 is indicated by a black dot mark. A display area 802 in which an evaluated value of a density is visualized is presented to a user. In the present example, differences in levels of distribution density of moving people or objects are displayed in shades of color. For example, a dark-colored portion represents a congested place with a high density. A plurality of arrows 801 indicate visualized movement directions and movement speeds of people. A direction of an arrow 801 indicates a movement direction of people, and a length of an arrow 801 indicates a movement speed of people.

Because each of statistical quantities computed by the object analysis unit 302 is visualized and superimposed on the captured image for display in the present example, it is possible to easily ascertain the surrounding environment, the congested state, and the like of the AGV 103.

Modified Example of Third Example

Next, a modified example of the third example will be described.

Modified Example 3-1

In the present modified example, information of statistical quantities computed by the object analysis unit 302 is superimposed and displayed on map information, instead of a captured image. The information processing apparatus 300 performs processing of acquiring the map information in advance, and outputting an image in which the information of statistical quantities has been superimposed on the map information to the display unit.

Modified Example 3-2

The example in which object analysis is performed on a current image captured by the imaging device 102 has been introduced in the third example. In the present modified example, information of statistical quantities computed by the object analysis unit 302 with respect to an image captured by the imaging device 102 in the past is superimposed and displayed on the captured image. Furthermore, the information processing apparatus 300 can aggregate the computed information of statistical quantities for each time slot and superimpose the aggregation result on the captured image or a map for display. With this operation, a congested time slot, a flow of people in each time slot, or the like can be visualized and then presented to a supervisor of the AGV 103.

Modified Example 3-3

In the present modified example, information of a movement direction or speed, a movement route, a movement position, and the like of the AGV 103 in addition to information of statistical quantities computed by the object analysis unit 302 is superimposed and displayed on a captured image or a map. Thus, a supervisor of the AGV 103 can visually ascertain the operation efficiency.

Modified Example of Above-Described Example

Although the AGV 103 of the above-described examples is an example of an autonomously moving mobile object, a mobile object of a route guidance type, for example, a mobile object with a magnetic tape as an inductor, is subject to movement control in the modified example. Specifically, in a case where a direction of a flow of people is close to a movement direction of the AGV 103, the movement speed of the AGV 103 is adjusted to that of the people and thus it moves according to the magnetic tape. In addition, a movement position of the AGV 103 can be adjusted by installing magnetic tapes at appropriate intervals so that the movement position of the AGV 103 can be changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-119540, filed Jul. 20, 2021, which is hereby incorporated by reference wherein in its entirety.

What is claimed is:

1. An information processing apparatus configured to perform movement control of a mobile object, the apparatus comprising:
   a memory storing instructions; and
   a processor executing the instructions causing the information processing apparatus to:
   acquire a captured image in which the mobile object and a surrounding environment of the mobile object have been captured;
   acquire information of a position or a posture of the mobile object;
   use a plurality of images acquired at different times to analyze a motion of a plurality of objects present in the surrounding environment of the mobile object; and
   determine to perform control to cause the mobile object to stand by for a predetermined period of time if a distribution density of the plurality of objects is greater than a first threshold and a difference between information indicating a movement direction of the plurality of objects and information indicating a movement direction in which the mobile object is moving toward a destination is greater than a second threshold.

2. The information processing apparatus according to claim 1, wherein the processor computes a statistical quantity of a movement direction or a movement speed of the plurality of objects, the distribution density of the plurality of objects, or a position of the plurality of objects from data of a group of images acquired in a predetermined period of time.

3. The information processing apparatus according to claim 2, wherein the processor determines a motion of the mobile object from one or more of a movement direction or a movement speed of plurality of objects, the distribution density of the plurality of objects, or a position of the plurality of objects analyzed using the captured image acquired in each time slot of the different times.

4. The information processing apparatus according to claim 2, wherein the processor determines an advance-possible area or an advance-not-possible area of the mobile object using a statistical quantity of the plurality of objects in each time slot.

5. The information processing apparatus according to claim 1, wherein, if any statistical quantity among a movement direction or a movement speed of the plurality of objects, the distribution density of the plurality of objects, and a position of the plurality of objects satisfies a predetermined condition, the processor determines a movement direction or a movement speed of the mobile object or a movement position of the mobile object.

6. The information processing apparatus according to claim 5, wherein, if the distribution density of the plurality of objects is less than the first threshold, or the distribution density of the plurality of objects is equal to or greater than the first threshold and the difference between a value indicating the movement direction of the plurality of objects and a value indicating a direction of the mobile object is less than the second threshold, the processor determines a movement direction of the mobile object.

7. The information processing apparatus according to claim 5, wherein the processor evaluates the relationship between an area in which the mobile object is positioned and an area indicating a position of the plurality of objects in a captured image to determine a position to which the mobile object will be moved.

8. The information processing apparatus according to claim 7, wherein, in a case where the area in which the mobile object is positioned is different from the area indicating the position of the plurality of objects, the processor performs processing of changing the movement position of the mobile object to the position determined based on the area indicating the position of the plurality of objects.

9. The information processing apparatus according to claim 5, wherein the processor evaluates the movement speed of the plurality of objects and the movement speed of the mobile object to determine the movement speed of the mobile object.

10. The information processing apparatus according to claim 9, wherein the processor performs processing of computing a speed difference between the movement speed of the plurality of objects and the movement speed of the mobile object, correcting the movement speed of the mobile object corresponding to the speed difference, and thus changing the movement speed of the mobile object.

11. The information processing apparatus according to claim 1, wherein the processor determines control details with respect to a movement of the mobile object using a statistical quantity of the plurality of objects.

12. The information processing apparatus according to claim 11, wherein the processor determines the movement speed of the mobile object as a first speed if the distribution density of the plurality of objects has a first value, and determines the movement speed of the mobile object as a second speed that is higher than the first speed if the distribution density of the plurality of objects has a second value that is smaller than the first value.

13. The information processing apparatus according to claim 11, wherein the processor determines an amount of change of the movement position of the mobile object as a first amount of change if the distribution density of the plurality of objects has a first value, and determines the amount of change of the movement position of the mobile object as a second amount of change that is smaller than the first amount of change if the distribution density of the plurality of objects has a second value that is higher than the first value.

14. The information processing apparatus according to claim 1, wherein the processor causes a statistical quantity that is an analysis result such as the movement direction or a movement speed of the plurality objects, the distribution density of the plurality of objects, or a position of the plurality of objects to be displayed.

15. A control system for a mobile object including an information processing apparatus and an imaging section configured to image the mobile object and a surrounding environment of the mobile object, the system comprising:
a memory storing instructions; and
a processor executing the instructions causing the information processing apparatus to:
acquire a captured image in which the mobile object and the surrounding environment of the mobile object have been captured;
acquire information of a position or a posture of the mobile object;
use a plurality of images acquired at different times to analyze a motion of a plurality of objects present in the surrounding environment of the mobile object; and
determine to perform control to cause the mobile object to stand by for a predetermined period of time if a distribution density of the plurality of objects is greater than a first threshold and a difference between information indicating a movement direction of the plurality of objects and information indicating a movement direction in which the mobile object is moving toward a destination is greater than a second threshold.

16. An information processing method performed by an information processing apparatus configured to control movement of a mobile object, the method comprising:
acquiring a captured image in which the mobile object and the surrounding environment of the mobile object have been captured;
acquiring information of a position or a posture of the mobile object;
using a plurality of images acquired at different times to analyze a motion of a plurality of objects present in the surrounding environment of the mobile object; and
determining to perform control to cause the mobile object to stand by for a predetermined period of time if a distribution density of the plurality of objects is greater than a first threshold and a difference between information indicating a movement direction of the plurality of objects and information indicating a movement direction in which the mobile object is moving toward a destination is greater than a second threshold.

17. A non-transitory storage medium on which is stored a computer program related to an information processing method, the method comprising:
acquiring a captured image in which the mobile object and the surrounding environment of the mobile object have been captured;
acquiring information of a position or a posture of the mobile object;
using a plurality of images acquired at different times to analyze a motion of a plurality of objects present in the surrounding environment of the mobile object; and
determining to perform control to cause the mobile object to stand by for a predetermined period of time if a distribution density of the plurality of objects is greater than a first threshold and a difference between information indicating a movement direction of the plurality of objects and information indicating a movement direction in which the mobile object is moving toward a destination is greater than a second threshold.

* * * * *